No. 815,433. PATENTED MAR. 20, 1906.
M. C. JOHNSON.
REVERSIBLE DRIVING MECHANISM.
APPLICATION FILED OCT. 7, 1904.
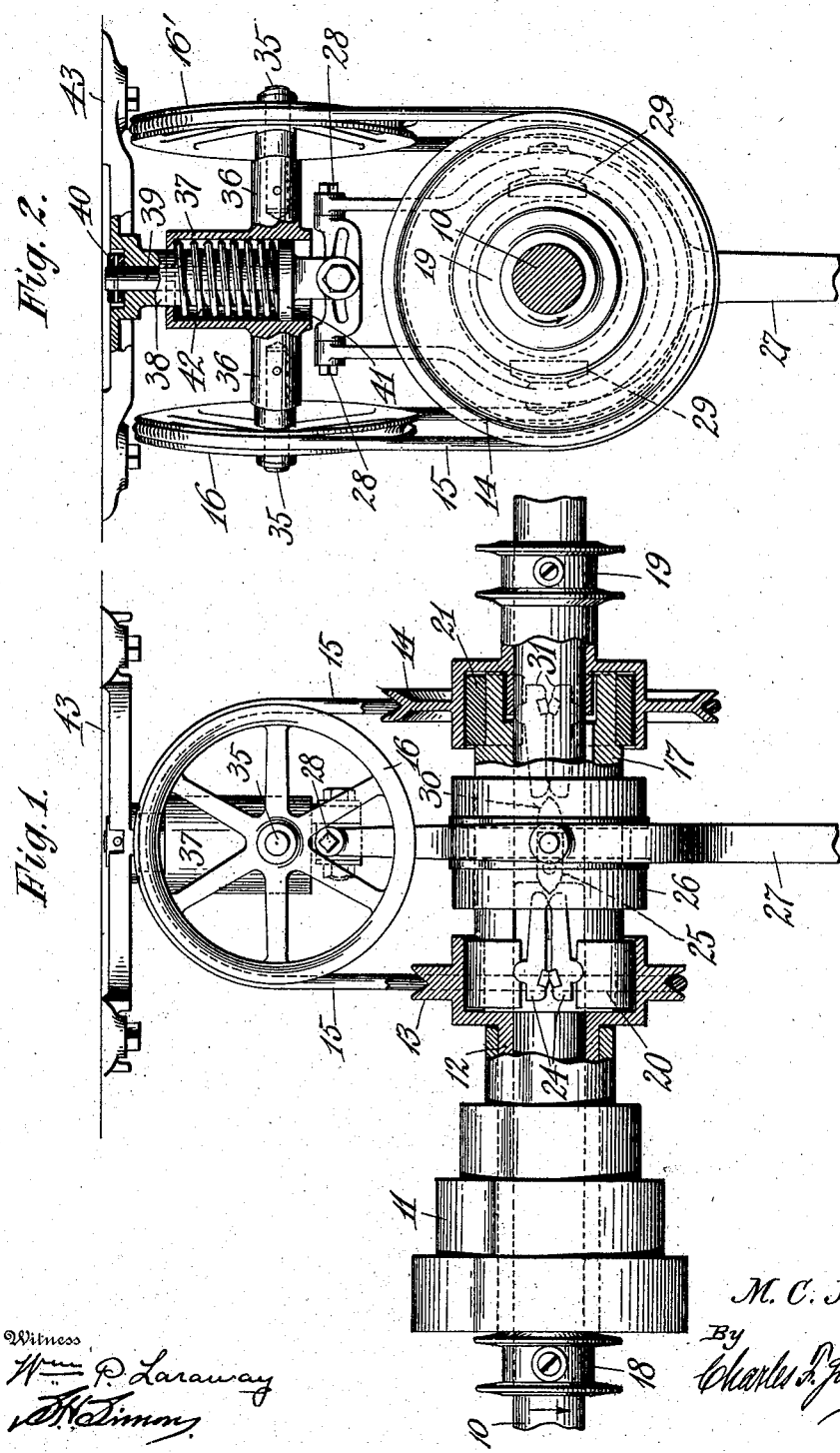

UNITED STATES PATENT OFFICE.

MOSES C. JOHNSON, OF HARTFORD, CONNECTICUT, ASSIGNOR TO THE CARLYLE JOHNSON MACHINE COMPANY, OF HARTFORD, CONNECTICUT, A CORPORATION OF OHIO.

REVERSIBLE DRIVING MECHANISM.

No. 815,433.     Specification of Letters Patent.     Patented March 20, 1906.

Application filed October 7, 1904. Serial No. 227,610.

*To all whom it may concern:*

Be it known that I, MOSES C. JOHNSON, a citizen of the United States, and a resident of Hartford, in the county of Hartford and State of Connecticut, have invented certain new and useful Improvements in Reversible Driving Mechanism, of which the following is a full, clear, and exact specification.

This invention relates to reversible driving mechanism, and more especially to that class thereof which is generally employed for driving machinery from a line of shafting; and it has for one of its objects the provision of a mechanism which will obviate the use of a counter-shaft and its usual open and cross belts for running the driven pulley (connected with the driven pulley of the machine) in opposite directions.

My invention has, furthermore, for its object the organization of the driven pulley directly upon the main line of shafting, but normally disconnected therefrom, while a suitable clutch may be provided for causing said pulley to be rotated with the line-shaft when required, and when disconnected from or loose on the shaft said pulley may be rotated in a direction opposite from another actuator, also normally loose upon the shaft, but adapted to be clutched thereto.

Briefly stated, my invention comprises a pair of pulleys normally loose upon the line-shafting and connected by a single loop-belt in such a manner that the rotation of one will produce a reverse rotation of the other, and a suitable clutch mechanism whereby either of said pulleys may be coupled to the line-shaft or both may be left disconnected therefrom.

My invention has, furthermore, for its object the provision of means for properly tensioning the belt which connects the pulleys, thus obviating the necessity of shortening the belt to take up slack and at the same time avoiding the wear and tear incidental to an excessively-tight belt.

In the drawings, in which similar characters denote similar parts, Figure 1 represents a front view of my improved mechanism, partly in section to disclose the construction of the clutch device; and Fig. 2 is a side view thereof.

As above stated, my invention has for its primary object a reversible driving mechanism which will obviate the use of a counter-shaft and its connections; but it should be understood that the mechanism may constitute a short line or counter operated from the main line by one single belt or its equivalent.

In the drawings, 10 denotes the line-shaft supported in suitable hangers (not shown) and rotated from any convenient source. Mounted upon the shaft 10 is a driven pulley 11, which may have a belt connection with the machine which it is desired to operate and which is preferably secured to a sleeve 12, loose upon the shaft 10 and having at one end a grooved pulley 13. Also loosely supported on the shaft 10 is another grooved pulley 14, which in the present instance is shown as having a larger diameter than the pulley 13 and which is connected therewith by a belt 15, passing from the pulley 14 over an idler 16, thence around the pulley 13, over an idler 16', and back to the pulley 14. From the foregoing it will be clearly seen that if either pulleys 13 or 14 be rotated the other will move in the opposite direction.

In order to retain the pulleys 13 14 in proper positions on the shaft longitudinally, I deem it advantageous to employ a spacing member 17, interposed between said pulleys and coöperative with collars 18 19, secured upon the shaft 10 outside of the pulleys 13 14, respectively. Means are provided for clutching either of said pulleys to rotate with the line-shaft 10, and I accomplish this result in a simple and efficient manner by the following mechanism: By referring to Fig. 1 it will be seen that the hubs of the pulleys 13 14 are bored out to form chambers the bottoms of which are in running contact with the ends of the spacing member 17, in the present instance rigidly secured upon the shaft 10 and carrying at its extremities fixed split friction-rings 20 21, adapted to engage with and drive the cupped hubs of the pulleys 13 14, respectively. As a matter of fact, the spacing member constitutes a fixed member which is keyed to the shaft and which may be clutched to either one of the pulleys 13 14 to impart movement thereto in unison with that of the shaft. Inasmuch as the friction-rings are carried on the body member 17, it follows that when the ring 20 is expanded to engage the hub of the pulley 13 the latter will be rotated with the shaft 10, and therefore the cone-pulley will be directly coupled therewith, while the pulley 14 runs as an idler.

Any suitable mechanism may be employed for expanding the friction-rings, the construction illustrated in the drawings comprising a pair of toggle-arms 24, the free ends of which are adapted to be spread apart by a wedge 25, carried on a spool-collar 26, shiftable longitudinally on the body member 17—as, for instance, by a shipper-lever 27, fulcrumed at 28 and having shoes 29 fitting in the groove 26' on the collar 26. The spool 26 carries also another wedge 30 for operating a pair of toggle-levers 31, whereby the friction-ring 21 may be expanded to engage the hub of the pulley 14, in which case the latter becomes directly coupled to the shaft and through the belt 15 drives the pulley 13 and the cone 11 in an opposite direction and at an increased rate of speed by virtue of the difference in the diameters of the pulleys 13 14.

The idlers 16 16' are rotatably mounted on studs 35, secured in lugs 36, projecting from tubular hub 37, held for rotatable adjustment and longitudinal movement on a central stem 38, bored to receive a spindle 39. The upper end of the spindle 39 has a collar 40 to support the same in the stem 38, and it is provided near its lower end with a flange 41 to serve as an abutment for a spring 42, the upper end of which rests against the inside of the tubular hub 37, so that the spring constantly tends to raise said hub relatively to the stem 38, which constitutes a trunnion formed on a fixed frame 43, secured to the building by any suitable means. In this manner it becomes evident that the idler-support may not only adapt itself to the pulleys 13 and 14, but will also keep the belt 15 under proper tension, as determined by the spring 42.

Having thus described the invention, what I claim is—

1. In combination with a shaft, driving-pulleys mounted thereon, a stem arranged above the shaft, a hub on the stem, said hub having a rotary and a longitudinal movement on the stem, idlers carried by the hub, a belt passing around the idlers and the pulleys on the shaft, and tension means carried by the hub.

2. In combination with a shaft, driving-pulleys mounted thereon, a stem arranged above the shaft, a hub on the stem, said hub having a rotary and a longitudinal movement on the stem, idlers carried by the hub, a belt passing around the idlers and the pulleys on the shaft, and a spring within the hub arranged to create tension for the belt.

3. In combination with a shaft, driving-pulleys mounted thereon, a stem above the shaft, a flange on the stem, a hub on the stem contacting with the flange, idlers carried by the stem, a belt passing around the idlers and the pulleys on the shaft, and a spring embracing the stem and interposed between an end of the hub and the flange of the stem.

MOSES C. JOHNSON.

Witnesses:
S. H. SIMON,
WM. P. LARAWAY.